United States Patent
Nafisi-Movaghar et al.

(10) Patent No.: US 8,974,844 B2
(45) Date of Patent: Mar. 10, 2015

(54) METHODS FOR STERILIZING, STABILIZING AND PACKAGING HARVESTED PRODUCE

(75) Inventors: Karim Nafisi-Movaghar, Walnut Creek, CA (US); Loren L. Druz, Clayton, CA (US)

(73) Assignee: Del Monte Foods, Inc., San Francisco, CA (US)

( * ) Notice: Subject to any disclaimer, the term of this patent is extended or adjusted under 35 U.S.C. 154(b) by 764 days.

(21) Appl. No.: 13/220,344

(22) Filed: Aug. 29, 2011

(65) Prior Publication Data
US 2013/0052314 A1 Feb. 28, 2013

(51) Int. Cl.
*A23B 7/08* (2006.01)

(52) U.S. Cl.
USPC ........... 426/233; 426/234; 426/244; 426/310; 426/326; 426/506; 426/521

(58) Field of Classification Search
CPC ........................................................ A23B 7/08
USPC .......... 426/233, 234, 244, 310, 326, 506, 521
See application file for complete search history.

(56) References Cited

U.S. PATENT DOCUMENTS

| | | | |
|---|---|---|---|
| 4,062,982 A | 12/1977 | McMillan et al. | |
| 4,739,140 A | 4/1988 | Reznik | |
| 4,838,154 A | 6/1989 | Dunn et al. | |
| 5,540,941 A | 7/1996 | Stevens et al. | |
| 5,789,006 A | 8/1998 | Jones et al. | |
| 6,399,130 B2 | 6/2002 | Parker | |
| 6,562,386 B2 | 5/2003 | Ruan et al. | |
| 2005/0249847 A1* | 11/2005 | Sinha et al. | 426/324 |
| 2007/0243297 A1 | 10/2007 | Keller et al. | |
| 2007/0243298 A1 | 10/2007 | Keller et al. | |
| 2007/0243299 A1 | 10/2007 | Keller et al. | |

FOREIGN PATENT DOCUMENTS

EP 0438885 7/1991

OTHER PUBLICATIONS

Sarang, S. et al. "Product Formulation for Ohmic Heating: Blanching as a Pretreatment Method to Improve Uniformity in Heating of Solid-Liquid Food Mixtures" vol. 72, Nr. 5, 2007—Journal of Food Science: pp. E227-E234.

(Continued)

*Primary Examiner* — Steven Leff
(74) *Attorney, Agent, or Firm* — Dilworth Paxson LLP

(57) ABSTRACT

Disclosed are methods for processing harvested produce such as fruits and vegetables, where the sterilization, stabilization and packaging is done in such a manner that it allows for longer retention of freshness, texture, flavor and overall quality than is possible with conventional retort processes and packaging. One specific embodiment discusses sterilizing and packaging harvested produce into a bulk storage container, comprising the steps of cleaning, dicing and blanching said produce, thereby creating pre-processed produce; adding water, at least one acid or salt, and at least one carbohydrate, to said pre-processed produce to form a mixture of pre-processed produce and a liquid packing medium; processing said mixture in an ohmic processing vessel to form a sterilized mixture suitable for aseptic packaging in said container, without first packaging said mixture.

11 Claims, 2 Drawing Sheets

(56) References Cited

OTHER PUBLICATIONS

Knirsch, Marcos Camargo et al. "Ohmic heating—a review" Trends in Food Science & Technology 21 (2010), pp. 436-441.

Ramaswamy, Raghupathy et al. "Ohmic Heating of Foods" Fact Sheet for Food Processors; Extension FactSheet, Food Science and Technology, Ohio State University Extension; FSE-4-05, pp. 1-3.

* cited by examiner

METHODS FOR STERILIZING, STABILIZING AND PACKAGING HARVESTED PRODUCE

FIELD OF THE INVENTION

The present invention generally relates to apparatuses, systems and commercial scale methods for sterilizing, stabilizing and packaging harvested produce, particularly fruits and vegetables.

BACKGROUND OF THE INVENTION

Two problems are generally encountered during the processing of harvested fruits and vegetables: managing year-round availability of fresh fruit and vegetables when the harvests are brief and seasonal; and storing the harvested products for long periods of time in warehouses, distribution centers and retail outlets without sacrificing freshness, quality and consumer appeal. The invention and its embodiments described herein improve apparatuses, methods and systems used to currently address these problems.

Fruits and vegetables start deteriorating in quality at some rate immediately following the harvest, caused by physical, chemical, enzymatic or microbiological reasons. To complicate the problem, the majority of fruit and vegetables are only seasonally available. In some cases, e.g., apricots, the season is shorter than a month. While it may be theoretically possible to harvest produce regularly at any time in at least one part of the world by taking advantage of the difference in climates and growing seasons, it is rarely economically viable to transport them from different parts of the world to the place where they are needed fresh year round. Locally grown fruits and vegetables are often also preferred over imports. For these reasons, the food industry has generally adopted the practice of preserving fruits and vegetables temporarily in bulk after harvest for later year-round supply to consumers.

Current methods for commercially processing harvested fruits and vegetables involve cleaning, preparation and blanching, canning the fruit with a packing medium, and conventional sterilization and stabilization methods using established retort processing (See FIG. 1). The retort process uses heat treatment, which can be particularly harsh for some fruits and vegetables, and causes undesirable physical and chemical changes which decrease product quality. These changes affect color, texture and appearance, alter flavor or destroy the existing endogenous nutrients in the fruits and vegetables. Color degradation also occurs because of Maillard browning reactions between sugar (e.g., fruit sugars such as glucose or fructose) and protein. Maillard browning is heat induced and, initially, produces colorless browning precursors. These precursors eventually become brown pigments as heat-treated fruit and vegetables age. The generation of precursors is directly related to the intensity of the heat treatment of the fruit and vegetables, and the conventional retort process, which typically focuses primarily on sterilization and product safety, can use excessive heat, which in turn results in the formation of more browning pre-cursors and directly results in reduced shelf life. Further, excessive heat can also caramelize the sugars in fruits and vegetables, further degrading product quality and shelf-life.

The packing medium used for storing retort-processed fruits and vegetables is generally a liquid that is either syrup (sugar, water with other ingredients) or brine (salt water with other ingredients). Typically the ratio of fruit to packing medium is about 60:40, and there is a desire to decrease the amount of packing medium required, so that there is more efficient use of the packaging and storage space. There is also interest in increasing the size of the product containers processed by retort. Since the retort-based stabilization process relies on conductive and convective heat transfer, the cans used for packaging also cannot be made larger than about 2 gallons without increasing the time of the retort process, which then further degrades quality (color, flavor and texture) of the fruit. For these reasons, fruit and syrup are commonly commercially packed in 1 gallon cans. For a typical commercial batch size of 500 gallons of fruit in packing medium, 500 separate cans are needed. Thus a commercial produce processing company that handles millions of pounds of fruits and vegetables per year utilizes a very significant number of these metal cans. A method to eliminate or significantly reduce the number of cans used for packing stock fruits and vegetables will reduce the storage, handling and distribution costs, as well as the environmental footprint of these activities.

In conclusion, there is a long-felt need to improve the sterilization, stabilization, and packaging of harvested fruits, vegetables and other produce that will allow for longer retention of freshness, color, texture and flavor and overall quality, and utilizes less packaging, than is currently possible with conventional retort processes and packaging.

DETAILED DESCRIPTION OF THE PREFERRED EMBODIMENT

Illustrative and alternative embodiments and operational details of apparatuses, systems and methods for sterilizing, stabilizing and packaging harvested produce, particularly fruits and vegetables, will be discussed in detail below with reference to the figures and tables provided. Sterilization generally refers to the process of eliminating forms of life, including transmissible agents (such as fungi, bacteria, viruses, spore forms, etc.) present on a surface or contained in a fluid. In the context herein, the level of sterilization is intended to be within the general commercial standards and requirements of the food industry, as regulated by various governmental agencies (such as the United States Food and Drug Administration), and well known to those skilled in the art.

As is discussed below, Applicants prefer ohmic heating techniques in these embodiments instead of retort processing. During ohmic heating, the heating time and temperature are optimized and the exposure of the fruit and vegetables to excessive heat is minimized. Consequently, the undesirable effects of the heating process are minimized. With the ohmic process, heat is generated internally and instantly due to the electrical resistance of the food component during the process. The heat generated is directly related to the electrical conductivity of the food components. While microwave and ohmic heating have a commonality related to the ionic nature of food components, ohmic techniques provide distinct advantages, particularly for processing of fruits and vegetables. In the case of microwave, the ionic components in the food (susceptors) are generally fixed; with ohmic heating, the ionic characteristics can be much better manipulated, resulting in more uniform heating of the food. Further, ohmic, with shorter processing times, allows for higher process throughput and is more amenable to large scale commercial processing of fruits and vegetables.

Figure 1:
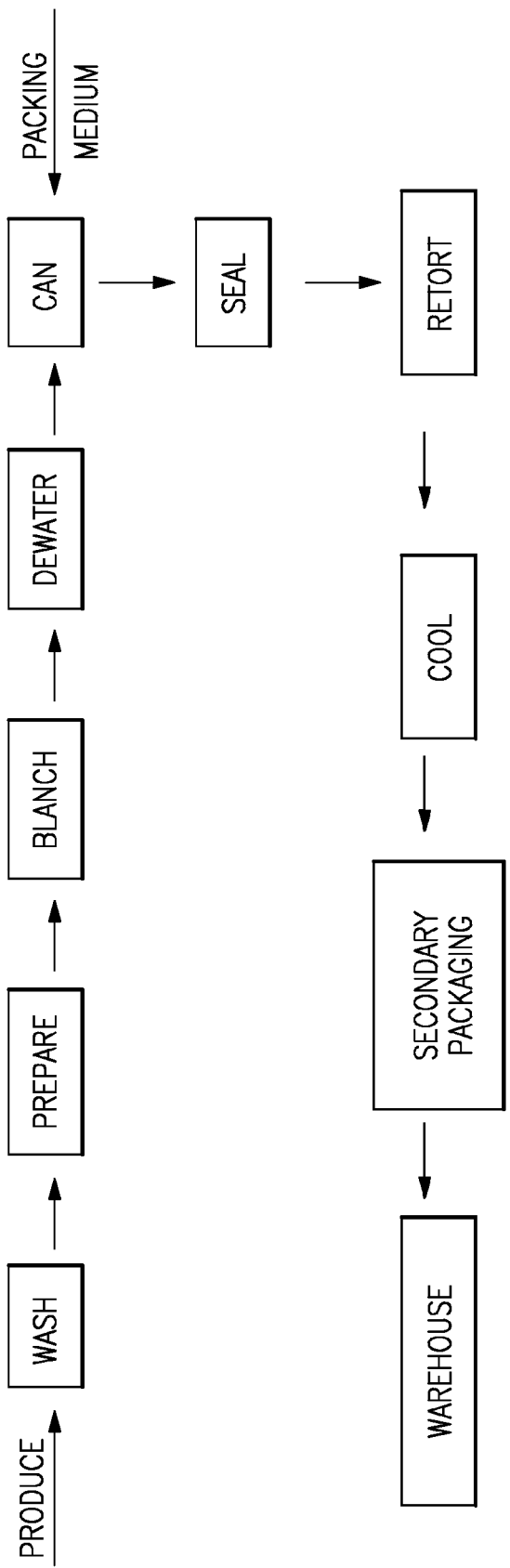
FIG. 1 is an overview of the prior art methods using conventional commercial canning and retort processing.
Figure 2:
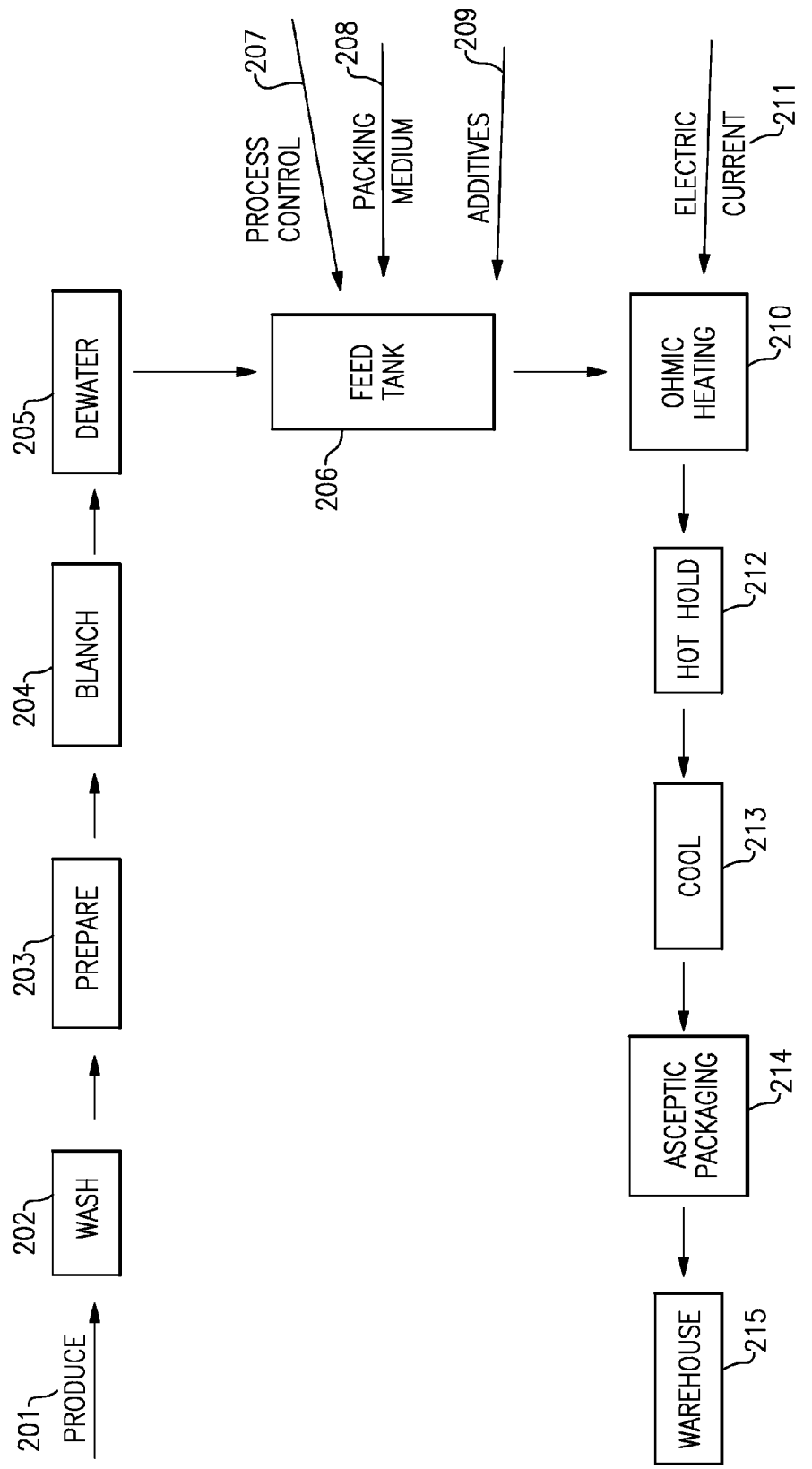
FIG. 2 is an overview of commercial systems and methods for sterilization, stabilization and packaging of harvested produce, according to an illustrative embodiment of the present invention.

In an illustrative embodiment, FIG. 2 shows an overview of a sterilization and stabilization process for produce. Harvested produce, (for example, fruit) (201) are first washed (202) and prepared (203), usually by peeling, pitting, slicing/dicing, depending on the type of fruit. Conventional commercial processes and apparatuses for washing and preparing are well-known. The prepared produce are then blanched in a blancher (204), usually accomplished by using steam and/or water at a blanching temperature ranging from 140-200° F., for 3-10 minutes, preferably 180° F. for 5 minutes. In case of water blanching, ionic compounds such as acids or salts are also added to increase the ionic strength of both the blanching solution and the produce. Both organic and inorganic acids can be utilized for this process, and these include, and are not limited to, one or a combination of, the following: citric acid, mallic acid, fumaric acid, lactic acid, ascorbic acid, sulfuric acid, phosphoric acid and/or a salt of these aforementioned acids (e.g., sodium acid sulfates or phosphates). Antifoaming agents (silicone or non-silicone based) are also added to the blancher, though it could be added later in the process.

After blanching, there is preferably a dewatering step (205), followed by additional pretreatments performed in a feed tank (206) or the like before moving to the next steps: ohmic heating (209), hot holding (212), cooling (213), aseptic packaging (214), and storage in the warehouse (215). During pre-treatment, a typical packing medium (208) is preferably further augmented by specific additives (209) that are designed to enhance the effectiveness of the ohmic processing step. These specific additives include acids (e.g., citric acid, mallic acid, fumaric acid, lactic acid, ascorbic acid), that are designed to reasonably balance the ionic conductivity of the solids and liquids which is important to the efficiency of the ohmic process. Salts of these acids (e.g., calcium lactate) are also useful to ohmic processing. Another class of additives that are beneficial to the ohmic process includes carbohydrates (monosaccharides, disaccharides, oligosaccharides and polysaccharides); sugar alcohols (e.g., sorbitol or other polyols); non-nutritives (e.g., saccharin, stevia, aspartame, acesulfame salts and sucralose) and the like (hereafter referred to individually as "sweetener" or collectively "sweeteners"). Further, the process conditions (e.g, temperature and pH) are also controlled (207) within specific ranges. The specific concentrations of the acids, sweeteners and the temperature/pH conditions used also depend, to some extent, on the type of fruits and vegetables being processed. Thus, from a process design perspective, it is important to take specific measurements of the average properties of the produce in the harvest that is being processed by the ohmic technique (e.g., the acidity, pH, texture, Brix, etc. of the fruit). These properties in turn will dictate the optimum process control variables (e.g., concentration of various additives to be used, temperature, etc.) to be used in the ohmic process, as will be discussed in more detail and with specific examples below. It is also important to note that the properties of these fruits and vegetables will change from season to season and from harvest to harvest.

While any commercially available ohmic processing vessel or reactor or heating tube will suffice for step 210, an Ohmic Aseptic Heat Exchanger Cooker (Model H.T.E. Ohmic/1000/C) from Asepsystems S.r.l., was used in the experiments. The use of an ohmic vessel for the processing of fruits or vegetables also requires a number of process design considerations. While ohmic processing offers higher speed, faster heat penetration and reduced thermal stress on the food compared with conventional retort heating, the consistency and efficiency of ohmic heating nevertheless depends on the composite conductivity of the material (here pre-processed produce and a packing medium) that is being heated. Typically, the higher the composite electrical conductivity of the food components and packing medium, the higher is the heat generated. When there is a mixture of different food materials and mediums, as is the case in fruit and vegetable processing, direct application of the ohmic process will result in inconsistencies of the electrical charges between the liquid medium and solid materials, causing distortion of the electric field, heat gradients and variations in the heating of the food. For example, if the medium is more ionic than the fruit or vegetable, the medium will heat faster than the fruit or vegetable, causing uneven temperature distribution. Alternatively, if the fruit or vegetables are more highly charged, they will heat much faster than the surrounding liquid. Balancing the conductivity of the solids and the surrounding medium is accomplished by using readily ionizable compounds, such as organic and/or inorganic acids, and/or soluble salts of these organic and/or inorganic acids. Either organic and inorganic acids, or their salts, can be utilized for this process. These include, and are not limited to, one or a combination of the following: citric acid, mallic acid, fumaric acid, lactic acid, ascorbic acid, sulfuric acid, phosphoric acid and/or a salt of these aforementioned acids (e.g., sodium acid sulfates or phosphates).

A variety of factors in the ohmic processing of produce to provide a more uniform conductivity (or the narrowest conductivity range for a particular produce application), or an optimal conductivity gradient, which ultimately results in better product quality (for example, texture), higher process efficiency, and longer shelf-life (typically at least 18 months). These factors include the following:

a) Shorter residence time during heating as compared to retort processing. For example, retort heating of fruits after harvesting is typically done for 30-60 minutes, whereas in the ohmic process it can be achieved in less than about 7 minutes, often between about 1-4 minutes depending on additives used and process conditions described herein. Heating in the ohmic process is accomplished in two steps: (i) an ohmic heating step that involves passage of current for a relatively short duration and allows the produce and packing medium to come up to temperature quickly (typical duration ranges from about 30 seconds to about 150 seconds); followed by (ii) a holding step where the produce and packing medium mix is allowed to remain hot in a separate holding section ("hot hold"—212—in FIG. 2) until the required sterilization limits for food consumption are met (typically from about 2 minutes to about 4 minutes). Typical temperatures to achieve sterilization in the food industry range from about 165° F. to about 220° F., and the temperature of the produce and packing medium in both the ohmic heating and the hot hold steps are kept within this range.

b) Addition of organic or inorganic acids to minimize oxidative browning. To avoid the formation of the Maillard browning precursors or carmelization, 200 ppm-4000 ppm of acid (preferably 800 ppm-1400 ppm of ascorbic or erythorbic acid) is added into the packing medium. Acid can be added at any stage prior to entry into the ohmic reactor. Increasing acid or decreasing pH also tends to reduce the formation of Maillard precursors in the ohmic reactor. Ascorbic acid is preferred because it also acts as an oxygen scavenger and further assists in reducing the amount of oxygen and minimizing oxidative browning. Therefore, the use of the preferred embodiments herein will substantially decrease the presence of Maillard precursors over the anticipated storage life, typically around 18 months. While Maillard precursors are difficult to measure in practice, people of skill in the art will recognize that the Maillard oxidative browning that can be detected as a brown color by commercially available ultraviolet (UV) spectrophotometers at about 420 nm.

c) Minimizing the amount of oxygen available within the process so that the formation of Maillard browning precursors is also minimized. Oxygen promotes product discoloration. In particular, having oxygen in the heating tubes of the Ohmic system is not desirable. De-aeration can be used to prevent excessive oxygen from entering the ohmic heating tubes. Besides removing or reducing oxygen, de-aeration also eliminates fruit flotation, and facilitates infusion of the sugar and ionic compounds (including ascorbic or other acids) into the fruit. Use of vacuum is also a cost-effective and practical method to reduce air and oxygen, typically about 2 inches to about 30 inches of vacuum for about 5-15 minutes, before the ohmic heating step (209).

d) Blanching the produce at about 140-200° F. In addition to denaturing the enzymes, blanching further assists the removal of free oxygen from inside the produce.

e) Antifoaming agents added during the process also result in a reduction of free oxygen in the final package because they reduce the surface tension.

f) A temperature differential ($\Delta T$) can be established between the blanching step and the final heating temperature that contributes to improvement of heat efficiency and overall product quality. $\Delta T$ typically ranges from 20-80° F., depending on the type of fruit, vegetable or other produce to be processed.

The general principles discussed above can be adapted and applied in a number of ways in the processing of fruits, vegetables and other produce. This is outlined briefly in some process examples below.

EXAMPLE 1

Diced, chunky, sliced or halved peaches were loaded into the blanching tank containing syrup from 8-12° Brix, depending on Brix value of the incoming fruit. The fruit is blanched in sugar syrup or fruit juice to create an isotonic condition and to prevent excessive loss of fruit solids to the blanching solution. The sugars used to create an isotonic condition range from monosaccharides, disaccharides, oligosaccharides, and polyols such as sorbitol or xylitol. A silicone based antifoaming agent was also added. The pH of the incoming peaches typically ranges from 3.3 to 4.0. The feed tank was charged with sugar syrup or fruit juice and the pH adjusted (by adding 800-1400 ppm of ascorbic acid) until the packing medium has about the same Brix value as the peaches (8-12° Brix target at 10° Brix). The fruit to syrup ratio for the peaches can range from about 90:10 to 60:40, but is optimally about 75:25 for peaches. The syrup and fruit mixture then is transferred to the ohmic processing vessel where it is brought up to temperature quickly by passing electric current through the mixture for a duration of about 90 seconds. Typical temperatures range from about 165° F. to about 220° F., with a target of about 190° F. The mixture is then held at this temperature for 3 minutes and then transferred to cooling tubes and cooled for between about 10 minutes to about 20 minutes, depending on the cooling temperature, which in turn ranges from about 40° F. to about 110° F., with a typical target temperature of about 70° F. or less.

After cooling, the fruit and packing medium, here a "commercial pre-consumer processed produce" (hereafter "CPCPP"), "material stock" or "ingredient stock," is aseptically packaged in bags, typically from about 3 to about 360 gallon size, under inert conditions provided by the use of nitrogen or any other inert gas. A steam flush can also be used to remove the air. The bags are typically made with high oxygen and moisture barrier quality composite polymers, including metalized bags. Depending on the type of produce being processed, other plastic or metal containers or bins can also be used for packaging the CPCPP.

An aseptically packaged "ohmic bin" typically holds about 2200 pounds of fruit and packing medium, which includes typically about 1760 pounds of fruit. Thus a single bin of bulk packed, ohmic processed peaches or pears replaces about 245 No. 10 (i.e., 1 gallon) cans. For a plant that processes over 25,000 tons of harvest fruit per year, the use of the methods described herein could eliminate over 7 million No. 10 cans (about 8000 pallets or 350 truckloads). Thus practicing the embodiments described herein can substantially reduce the use of metal cans, pallets, energy, transportation and other operating costs which results in a significant improvement in the overall environmental footprint of the fruit, vegetable or produce processing plant.

EXAMPLE 2

Same as Example 1 except that syrup in the feed tank was acidified by food grade acids or their salts to a pH value 0.1-1.0 unit higher than the pH of incoming fruits.

EXAMPLE 3

Example 3 is similar to Example 1 except the conductivity of the syrup and the blanched peaches were equalized.

EXAMPLE 4

Example 4 is similar to Example 1 except pears were used and the optimal ratio of fruit to packing medium for pears was about 70:30.

EXAMPLE 5

Example 5 is similar to Example 4 except water is used in place of the syrup, and the conductivity of the packing medium was adjusted to be similar to fruit.

EXAMPLE 6

Example 6 is similar to Example 5 except the pH of the water was adjusted by adding ionic compounds and acids to about 0.1-1.0 pH higher than the fruit.

In addition to the many benefits of the process that has been described above, use of this process also significantly improves the final quality of the processed produce. To demonstrate this, fruit (diced peaches) from the same harvest was processed through both the conventional retort process, and through the ohmic methods described herein. A texture analyzer (a TAXT 2I texturometer with a 29 pronged probe) was used to compare the average texture at the time of pack for the retort process against the ohmic process and the results are summarized in Table 1 below.

TABLE 1

Fruit (Diced Peaches) Texture Data - Retort and Ohmic Process

| Run No. | Retort Process Texture at Time of Pack (g · mm) | Ohmic Process Texture at Time of Pack (g · mm) |
|---|---|---|
| 1 | 95,951 | 108,657 |
| 2 | 89,233 | 107,953 |
| 3 | 78,735 | 132,220 |
| 4 | 80,213 | 109,344 |
| 5 | 90,190 | 136,440 |
| 6 | 78,152 | — |
|  | Mean: 85,412 | Mean: 118,923 |

The average texture of peaches processed by ohmic methods is about 40% higher than the average texture of peaches from the same harvest processed by the conventional retort process. Such texture improvements can apply to other tree fruit (e.g., pears, apples etc.), vegetables and other produce that are sterilized and stabilized using the ohmic process. Thus it is believed that improved CPCPP may be created.

As discussed earlier, manipulation of the conductance of the packing medium—i.e., matching or synchronizing it closely to the conductance of the fruit—is also an important aspect of some embodiments. Since there are variations in maturity and texture in the incoming fruit even during the harvest season, it can, in some instances, be desirable to know the variables that can be used to dynamically control the conductance of the packing medium during ohmic processing. Further, in commercial practice, it could be the case that the majority of the fruits or vegetables sterilized by the ohmic process will be stored as CPCPP. This CPCPP may typically be reheated again to sterility in the small containers for the retail market during the year. Consequently, reheating the fruit or vegetables where the conductance has already been closely matched during the ohmic heating helps improve retention of texture, flavor and color in reheating. Thus another reason to balance the conductivity of the fruit and packing medium is to maintain fruit integrity and texture over longer periods. A brief discussion of methods to control conductance follows.

Temperature can be an important variable used in conductance control but in practice there may be restrictions on manipulating temperature when the raw fruit in the harvest being processed is more ripe or has a softer texture. So the roles of other additives may become more important in the control of the ohmic process.

Table 2 below shows the changes in conductance of the liquid media for various additives, at various concentrations, as a function of temperature, for peaches and pears.

TABLE 2

Variation of Conductance with Temperature and Additives
(Conductance in µSiemens/cm and additive concentrations in weight %)

| Additives | Conductance of Packing Medium | | |
|---|---|---|---|
|  | 25° C. | 60° C. | 80° C. |
| No Additives (Local water) | 250 | 300 | 316 |
| Ascorbic Acid (0.25%) | 1675 | 1650 | 1890 |
| Ascorbic Acid (0.50%) | 1500 | 1560 | 1700 |
| Ascorbic Acid (0.75%) | 1675 | 1650 | 1890 |
| Ascorbic Acid (1.00%) | 1775 | 1760 | 2120 |
| Calcium Lactate (0.20%) | 1870 | 2130 | 2400 |
| Calcium Lactate (0.30%) | 2300 | 2500 | 2730 |
| Sugar (5.00%) | 1570 | 1680 | 1780 |
| Sugar (10.00%) | 1400 | 1570 | 1670 |
| Sugar (20.00%) | 1000 | 1130 | 1250 |

As indicated, ascorbic acid and calcium lactate can be used in increasing the conductivity. Other analogues of these acids and salts would also work—e.g., erythorbic acid can be substituted for ascorbic acid. While these additives are useful to increase the conductivity, it is also found, rather surprisingly, that the addition of carbohydrates (such as sugar), traditionally a non-electrolyte, in conjunction with these other additives can decrease conductivity. Thus carbohydrate or sugar concentration is a key variable in controlling the ohmic processing of fruits, vegetables and other harvested produce.

While the invention has been described above in conjunction with specific embodiments, it is evident that many alternatives, modifications, permutations and variations will become apparent to those skilled in the art in light of the foregoing description. Though the discussion above focused more on fruits, the teachings herein apply equally to vegetables and other produce, more particularly to non-leafy vegetables such as green beans, corn, carrots, peas and the like. Accordingly, it is intended that the present invention embraces all such alternatives, modifications and variations as fall within the scope of the claims below.

What is claimed is:

1. A method of manufacturing CPCPP for storage in a commercial bulk storage container, comprising the steps of:
   preparing and blanching said produce, thereby creating pre-processed produce,
   adding water and at least one acid or salt to said pre-processed produce to form a mixture of pre-processed produce and a liquid packing medium,
   passing electric current through said mixture in an ohmic processing vessel to bring it up to a temperature range of between about 165° F. and about 220° F., thereafter holding said mixture within said temperature range for between about 2 minutes and about 4 minutes, to form said CPCPP suitable for aseptic packaging in said container, without first packaging said mixture,
   where the fraction by weight of said pre-processed produce in said container ranges from about 65% to about 90%.

2. The method of claim 1 wherein a carbohydrate sweetener is also added to said packing medium prior to passing electric current.

3. The method of claim 1 wherein said step of passing electric current occurs at a temperature that is about 20° F. to 80° F. greater than the temperature of said blanching step.

4. The method of claim 1 where the volume of said container is more than 2.5 gallons.

5. The method of claim 1 wherein said adding comprises adding at least one of: citric acid, mallic acid, fumaric acid, lactic acid, ascorbic acid, erythorbic acid, sulfuric acid, phosphoric acid, sodium acid sulfate and sodium acid phosphate to said mixture.

6. The method of claim 1 where said packing medium further includes an anti-foaming agent.

7. The method of claim 1 where the pH of said packing medium is adjusted to within 0.1 of the average pH of said produce in a step prior to said passing of electric current.

8. The method of claim 1 where said produce is fruit selected from the group consisting of: peach, pear, pineapple, cherry, mangos, grapes, orange, grapefruit, kumquat, pomelo, tangelo, citrange, citron, lemon, lime, mandarin and tangerine.

9. The method of claim 1 where said produce is a single type of fruit selected from the group consisting of: peach, pear, pineapple, cherry, mangos, grapes, orange, grapefruit, kumquat, pomelo, tangelo, citrange, citron, lemon, lime, mandarin and tangerine.

10. The method of claim 9 wherein said fruit is a peach and has a texture that is greater than about 100,000 g·mm when measured at about the time of said aseptic packaging.

11. The method of claim 1 wherein said passing of electric current has a duration of between about 30 seconds and about 150 seconds.

* * * * *